US00RE44571E

(19) United States
(12) Reissued Patent
Fukinuki et al.

(10) Patent Number: US RE44,571 E
(45) Date of Reissued Patent: Nov. 5, 2013

(54) NAILER DEVICE

(75) Inventors: Masatoshi Fukinuki, Jiangsu (CN); Toshinari Yamaoka, Jiangsu (CN); Gan Wei, Jiangsu (CN); Zhiguo Chen, Jiangsu (CN); Guillaume Keller, Jiangsu (CN)

(73) Assignee: Chervon (HK) Limited, Wanchai (HK)

(21) Appl. No.: 13/506,855

(22) Filed: May 17, 2012

Related U.S. Patent Documents

Reissue of:
(64) Patent No.: 8,074,856
Issued: Dec. 13, 2011
Appl. No.: 12/621,867
Filed: Nov. 19, 2009

U.S. Applications:
(63) Continuation of application No. 12/565,487, filed on Sep. 23, 2009, now Pat. No. 7,963,430.

(30) Foreign Application Priority Data

| | | |
|---|---|---|
| Oct. 15, 2008 | (CN) | 2008 2 0186215 U |
| Oct. 22, 2008 | (CN) | 2008 2 0186329 U |
| Oct. 29, 2008 | (CN) | 2008 2 0161341 U |
| Oct. 29, 2008 | (CN) | 2008 2 0161342 U |
| Nov. 14, 2008 | (CN) | 2008 2 0217938 U |

(51) Int. Cl.
*B25C 1/06* (2006.01)

(52) U.S. Cl.
USPC ..... 227/131; 173/109; 173/205; 173/216; 173/217

(58) Field of Classification Search
USPC ..... 227/131, 147, 134; 173/109, 201, 138, 173/205, 216, 217
See application file for complete search history.

(56) References Cited

U.S. PATENT DOCUMENTS

| | | | | |
|---|---|---|---|---|
| 2,500,402 | A * | 3/1950 | Craig | 173/94 |
| 3,486,569 | A * | 12/1969 | Sieber | 173/93.5 |
| 4,114,699 | A * | 9/1978 | Wolf | 173/109 |
| 4,529,044 | A * | 7/1985 | Klueber et al. | 173/48 |
| 4,732,217 | A * | 3/1988 | Bleicher et al. | 173/104 |
| 4,770,254 | A * | 9/1988 | Kominami | 173/109 |
| 5,025,869 | A * | 6/1991 | Terunuma et al. | 173/98 |
| 5,443,196 | A * | 8/1995 | Burlington | 227/131 |
| 6,172,472 | B1 * | 1/2001 | Klingbeil | 318/244 |
| 6,213,222 | B1 * | 4/2001 | Banach | 173/1 |
| 6,431,430 | B1 * | 8/2002 | Jalbert et al. | 227/131 |
| 6,959,478 | B2 * | 11/2005 | Chen | 29/435 |
| 7,263,920 | B1 * | 9/2007 | Hamilton | 81/466 |
| 7,306,047 | B2 * | 12/2007 | Oda et al. | 173/48 |
| 7,320,374 | B2 * | 1/2008 | Folk et al. | 175/220 |
| 7,410,009 | B2 * | 8/2008 | Hirayama et al. | 173/201 |
| 7,963,430 | B2 * | 6/2011 | Fukinuki et al. | 227/131 |

FOREIGN PATENT DOCUMENTS

| | | |
|---|---|---|
| CN | 200410088827 | 10/2006 |
| WO | 2006008546 | 1/2006 |

* cited by examiner

*Primary Examiner* — Scott A. Smith
(74) *Attorney, Agent, or Firm* — Greenberg Traurig, LLP

(57) ABSTRACT

An electrical device, such as a nailer device, has a motor and a gear housing containing a transmission mechanism. The transmission mechanism is coupled to the motor for driving an impact member. The transmission mechanism includes a shaft having a through-hole wherein a first opening of the through-hole is communicated with the interior of the gear housing and a second opening of the through-hole is communicated with an exterior of the gear housing.

3 Claims, 17 Drawing Sheets

NAILER DEVICE

Matter enclosed in heavy brackets [ ] appears in the original patent but forms no part of this reissue specification; matter printed in italics indicates the additions made by reissue.

RELATED APPLICATION DATA

This application claims the benefit of and is a continuation of U.S. application Ser. No. 12/565,487, filed on Sep. 23, 2009, now U.S. Pat. No. 7,963,430, which application, in turn, claims the benefit of Chinese Patent Application No. 200820186215.7, filed on Oct. 15, 2008, Chinese Patent Application No. 200820186329.1, filed on Oct. 22, 2008, Chinese Patent Application No. 200820161341.7, filed on Oct. 29, 2008, Chinese Patent Application No. 200820161342.1, filed on Oct. 29, 2008, and Chinese Patent Application No. 200820217938.9, filed Nov. 14, 2008, each of which is incorporated herein by reference in its entirety.

BACKGROUND

The following generally relates to a nailer device and, more particularly, relates to an electric nailer device.

Nailer devices are commonly used portable tools. In accordance with the type of power source utilized, nailer devices can be generally divided into two types, e.g., pneumatic nailer devices and electric nailer devices. A pneumatic nailer device is operated with an air compressor attached as a power supply, which is commonly inconvenient for a user to move to different places during operation, so that the using of the pneumatic nailer device is limited in many occasions. An electric nailer device generally comprises a transmission mechanism for transmitting rotating motions of a motor into linear movements of an impact rod arranged in a nozzle. When a switch on the nailer device is turned on, electric power energy is thus converted into mechanical energy of reciprocating motions.

Both U.S. Pat. No. 6,431,430 and PCT Publication No. WO2006/008546 disclose a kind of electric nailer device powered by a battery pack. The disclosed nailer device comprises a crank-slider transmission mechanism for transferring rotating motions of a motor into linear motions. However, one disadvantage of this kind of nailer device is that the crank-slider transmission mechanism substantially performs push actions and the nailing efficiency of such push actions is much lower than that of strike actions when the nailer device is provided with the same motor power. Another disadvantage is that the push power of the pushing rod driven by the crank-slider transmission mechanism is a constant, so when the nail meets a hard object, the resistance force caused thereby may cause the rotor of the motor to stop subjecting the motor to possible damage. A further disadvantage is that the motor is arranged in front of or behind the handle so that the connection between the motor and the transmission mechanism takes a lot of space which makes the nailer device relatively larger and inconvenient for a user to carry.

Yet further, Chinese Patent Application No. 200410088827.9 discloses a nailer device comprising a transmission mechanism which transfers rotational power of a motor to provide a compression force to a spring whereupon the spring is released through a release means to produce an impact force. This nailer device can carry out a single-strike action under the spring force, but not a continuous strike action, so the work efficiency is still relatively low, which results in the nailer device not gaining acceptance as a commonly used tool. Otherwise, the motor is arranged below the head of the housing, which is apart from the handle, so the structure of the nailer device is not compact.

SUMMARY

The following describes an improved electric nailer device which can carry out continuous strike actions. To this end, the nailer device comprises a housing containing a motor and a transmission mechanism. A housing has a nozzle portion with a striking rod for striking a nail being arranged therein, and the striking rod is moved in a reciprocating manner. A rotating shaft is mounted in the housing, and the rotating shaft is coupled to the output shaft of the motor through the transmission mechanism. An impact member is surrounding the rotating shaft and being moved with the rotating shaft. Corresponding slots are formed on the rotating shaft and the impact member respectively and mated with each other, with engagement members being contained in the corresponding slots.

The striking device may comprise a striking portion which can contact a head of a nail to be stricken and an impacted portion which can be contacted with the impact assembly.

The striking device may comprise a reciprocating member which can be moved in a reciprocating manner relative the housing.

The impact assembly may comprise a rotary impact member having a rotating axis.

The rotary impact member may comprise at least an impact part which can contact the impacted portion of the striking device periodically.

As will become apparent, the rotating motions of the motor are converted within the subject nailer into reciprocating striking movements of the striking device with the aid of a restoring device. Thus, while the motor continues rotating, the rotating motions of the motor are converted into periodic impact actions of the impact assembly through the transmission mechanism allowing the striking device to be driven with reciprocating movements to continuously strike the nail. The subject nailer also provides a relatively more compact structure and can carry out efficient and continuous strike actions, which overcomes the disadvantages of a single-strike or shoot-type nailer device of the prior art. Compared with this prior art, the subject nailer device is substantially different and improved so that the nailer device can be applied in different work occasions.

A better appreciation of the objects, advantages, features, properties, and relationships of the electric nailer disclosed hereinafter will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the subject electric nailer reference may be had to the following drawings in which.

DETAILED DESCRIPTION

Figure 1:
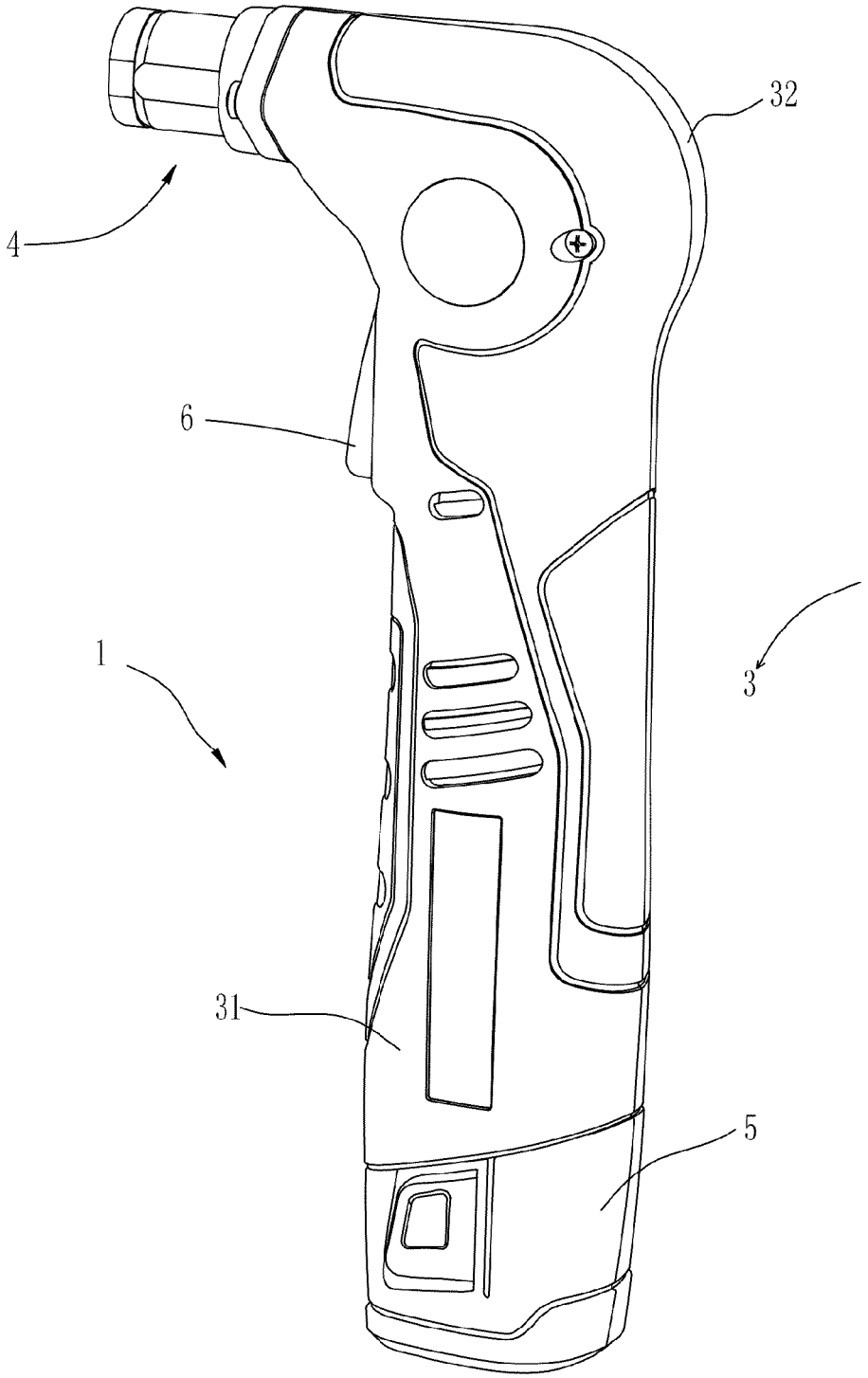
FIG. 1 is a perspective schematic view of a preferred first embodiment of a nailer device according to the present invention.
Figure 2:
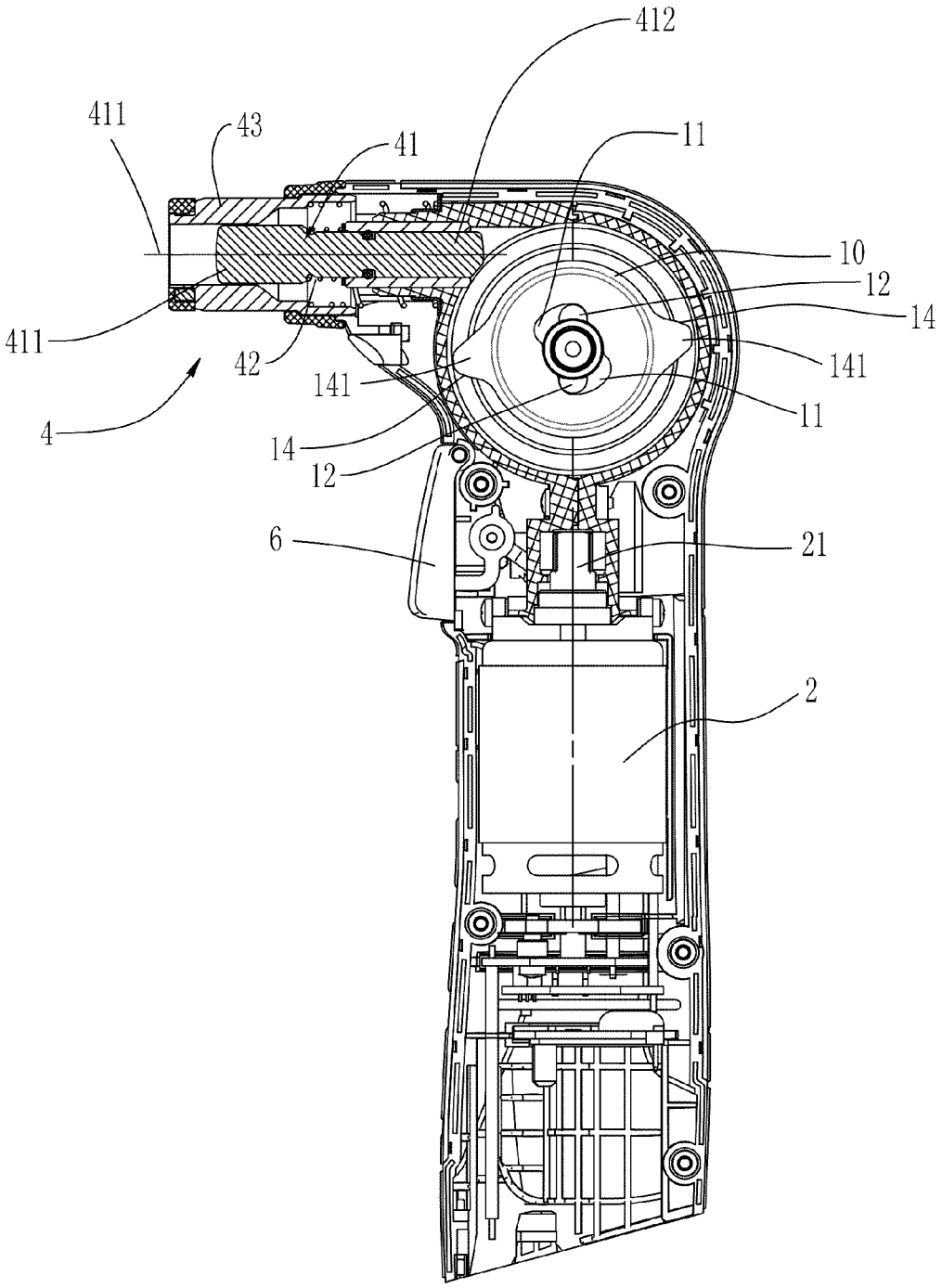
FIG. 2 is a cut-away view of the nailer device of FIG. 1 taken along a combination surface of the two half housings, wherein a battery pack of the nailer device is removed for clarity.

As shown in FIGS. 1 and 2, a nailer device 1 of a preferred first embodiment comprises a housing 3 containing a motor 2 and a nozzle portion 4. The housing 3 is composed with a first half housing 31 and a second half housing 32. A substantially vertical grip is formed by a main body of the housing 3. An upper portion of the housing 3 extends forward to form as the nozzle portion 4. The nailer device 1 further comprises a battery pack 5 for powering the motor 2. However, the nailer device 1 according to the present invention need not be restricted to the use of a DC power supply and may be equally powered by a source of AC power. A switch 6 is arranged on the housing 3 for controlling the motor 2. The nozzle portion 4 includes a striking rod 41 mounted therein for striking a nail 7, with a restoring spring 42 being mounted by surrounding the striking rod 41. The striking rod 41 is disposed substantially perpendicular to the main body of the housing 3 and is moved in a reciprocating manner within the nozzle portion 4. The striking rod 41 is shaped generally like a shaft, including a first end 411 for striking the nail and a second end 412 to be impacted. During operation, the striking rod 41 is driven to move and the first end 411 acts on a head of the nail. The nozzle portion 4 further includes a retractable nail containing sleeve 43 which is provided with an opening for containing at least the head of the nail.

Figure 3:
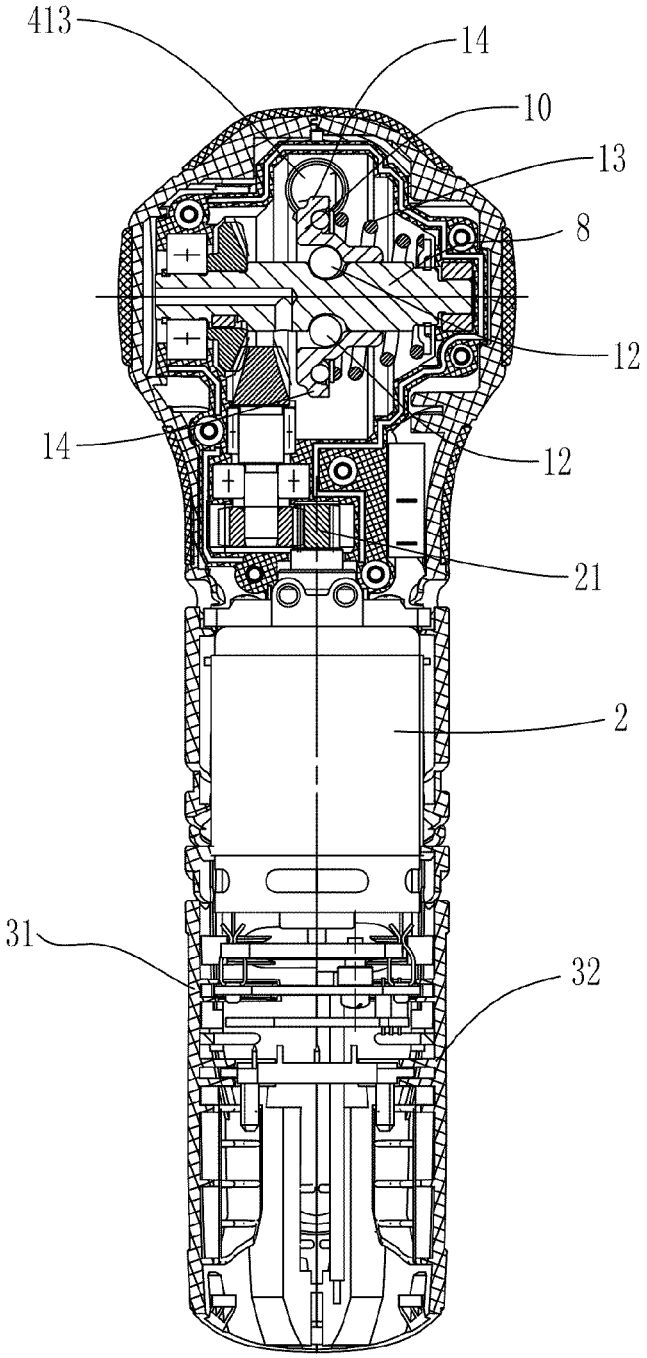
FIG. 3 is a cut-away view of the nailer device of FIG. 1 taken along the surface which is perpendicular to the combination surface of the two half housings, wherein the battery pack of the nailer device is removed for clarity.
Figure 4:
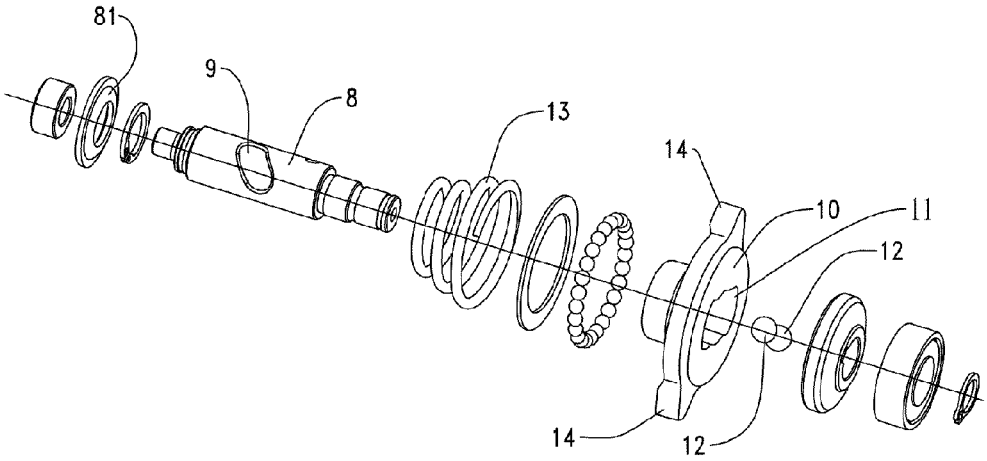
FIG. 4 is a partial exploded view of a transmission mechanism of the nailer device of FIG. 1.

As shown in FIGS. 2-4, a transmission mechanism is arranged in the housing 3 for converting rotating motions of the motor 2 into impact motions of the striking rod 41. The motor 2 is mounted vertically within the housing 3, having an upward motor shaft 21 connected with a multi-stage gear transmission mechanism including bevel gears. In this way, the rotation power of the motor 2 is transmitted to a rotating shaft 8 which is mounted in the upper portion of the housing 3 by two bearings. A pair of inclined slots 9 is formed on the rotating shaft 8. An impact wheel 10 is mounted on the rotating shaft 8. The impact wheel 10 comprises a pair of guiding slots 11 which are formed on its inner wall and opposite to the inclined slots 9 respectively. A pair of steel balls 12 is arranged movably in two chambers formed by the inclined slots 9 and the guiding slots 11. When the inclined slots 9 are moved relative to the guiding slots 11, the chambers formed thereby are moved with a result that the steel balls 12 can be moved along with the chambers. The impact wheel 10 can thus be driven to rotate through the steel balls 12 within the inclined slots 9 when the rotating shaft 8 is rotated. A pair of projections 14, which are extended along the diameter direction of the rotating wheel 10, is provided on the periphery of the rotating wheel. An energy storing spring 13 is mounted between the impact wheel 10 and the rotating shaft 8 in manner so that one end of the energy storing spring 13 abuts to a shoulder 81 of the rotating shaft 8 and the other end of the energy storing spring 13 abuts to a side surface of the impact wheel 10. Under an axial biasing force of the energy storing spring 13 acting upon the impact wheel 10 along the axial direction of the rotating shaft 8, the impact wheel 10 is located at a first axial position relative to the rotating shaft 8. In the first axial position, the impact wheel 10 rotates in a circle by means of the rotating shaft 8 and the steel balls 12. When the impact wheel 10 is rotated to a position where the projections 14 contact the second end 412 of the striking rod 41, and the striking rod 41 encounters a larger resistance that is difficult to be overcome provisionally, the impact wheel 10 is temporarily stopped from rotating by the striking rod 41, so that the impact wheel 10, under the cooperation of the steel wheels 12, the guiding slots 11 and the inclined slots 9, overcomes the axial force of the spring 13, compresses the energy storing spring 13 and moves from the first axial position to a second axial position relative to the rotating shaft 8. At the second axial position, the projection 14 of the impact wheel 10 departs from the striking rod 41, and the stopping is released. In this case, the energy storing spring 13 starts to release its elastic potential energy. Under a function of rebound axial force of the energy storing spring 13, the impact wheel 10 is pressed back to its first axial position quickly, and is moved at a higher speed than that of the rotating shaft under the cooperation of the inclined slots 9, the guiding slots 11 and the steel wheels 12. As a result, the second end 412 of the striking rod 41 is impacted by the projections 14 of the impact wheel 10 to move at a high speed in a direction away from the projections 14 and the striking rod 41 strikes the head of the nail 7 quickly. In this way, a strike action is achieved. When the impact wheel 10 is continuously driven to rotate to be stopped by the striking rod 41, it enters into succeeding cycles, which will be achieved in the same manner.

Figure 5:
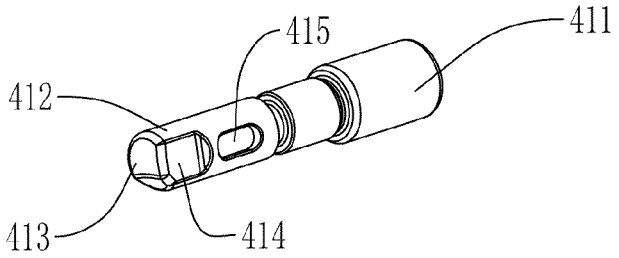
FIG. 5 is a perspective schematic view of a striking rod of the nailer device of FIG. 1.

FIG. 5 shows the striking rod 41 used in the preferred first embodiment. The second end 412 of the striking rod 41 has an end face 416. The striking rod 41 comprises a flat surface 414 on the peripheral outer surface adjacent to the second end 412. The flat surface 414 joins the end face 416 of the second end 412 and is parallel to a surface 141 of the projection 14 which contacts with the striking rod 41 when the impact wheel 10 is in the second axial position. During an impact, when the impact wheel 10 is in the first axial position relative to the rotating shaft 8, the impact wheel 10 rotates in a circle and arrives at a predetermined position so that the projection 14 contacts with the end face 416 of the striking rod 41 and, when the impact wheel 10 is moved from the first axial position to the second axial position, the impact wheel 10 is released from stepping by the end face 416 of the striking rod 41. Within a short time after the stopping is released, the projection 14 does not completely depart from the striking rod 41. At this time, the projection 14 presses and contacts the flat surface 414 on the peripheral outer surface of the striking rod 41 adjacent to the end face 416. When the projection 14 departs completely from the striking rod 41, the projection 14 disengages with the flat surface 414. As compared with a cylindrical surface or an arc surface, the flat surface 414 makes the contact area between the projection 14 and the peripheral outer surface of the striking rod 41 increased, so that the abrasion of the second end 412 due to the friction between the projection 14 and the peripheral outer surface of the striking rod 41 is reduced. In addition, a pair of grooves 415 are provided on the peripheral outer surface of the striking rod 41 and located on the opposite sides of the striking rod 41. Two through-holes are formed on the gear box 15, corresponding to the grooves 415.

Figure 6:
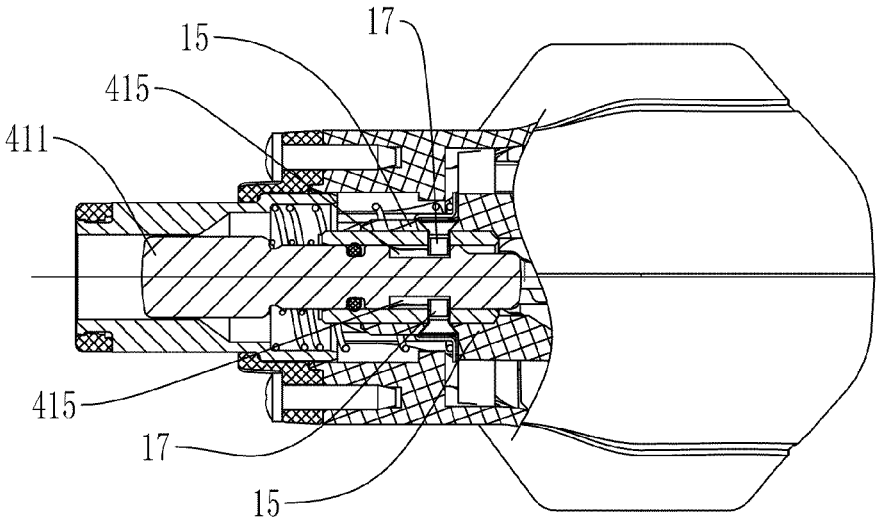
FIG. 6 is a top plan view of the nailer device of FIG. 1, wherein the nozzle portion of the nailer device is cut away.

As shown in FIG. 6, after the striking rod 41 is inserted into the gear box 15, a pair of pins 17 are hold in the through-holes of the gear box 15 and extend partially into the grooves 415 on the striking rod 41, so that the striking rod 41 is mounted within the gear box 15 and is prevented from running out from the nozzle portion 4. The pins 17 are fitted for the grooves 415 of the striking rod 41 and prevent the striking rod 41 from rotating around its longitudinal axis 411 so that the projection 14 contacts the flat surface 414 all the way in the second axial position. That is to say, the friction between the projection 14 and the striking rod 41 occurs on the flat surface 414 with larger contact area, rather than on the other portions of the peripheral outer surface of the striking rod 41. The grooves 415 have a length in the direction of the longitudinal axis 411 of the striking rod 41. During the impact, the striking rod 41 is moved back and forth over the length along its longitudinal axis 411. The restoring spring 42 is arranged between the striking rod 41 and the gear box 15 for bringing the striking rod 41 restoring back after a movement along its longitudinal axis.

It should be understood that the above-mentioned pair of grooves 415 may also be replaced by one through-groove running though the striking rod 41. Accordingly, the striking rod 41 can be mounted onto the gear box 15 by one pin 17 passing though the through-hole on the gear box and the through-groove, and be prevented from rotating around its longitudinal axis 411. It is conceivable for the skilled that, the sliding connection that is realized along the longitudinal axis of the striking rod 41 by the above-mentioned pair of grooves, the pair of holes and the pair of pins can also be achieved by utilizing one groove, one hole and one pin. It is also conceivable that, the sliding connection along the longitudinal axis of the striking rod can be realized if the groove on the striking rod is reversed with the hole on the gear box or the hole on the gear box is changed into the groove with a length in a direction of the longitudinal axis of the striking rod. As a connection member, the pin may also be replaced by any other connection members with suitable shapes and configurations.

Figure 7:
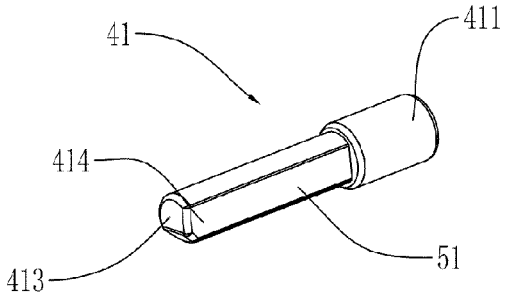
FIG. 7 is a perspective schematic view of a striking rod of a nailer device according to a second embodiment of the present invention.
Figure 8:
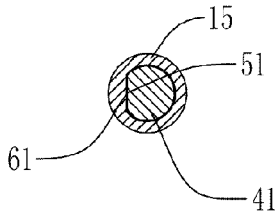
FIG. 8 is a cross sectional view of a portion where the striking rod in FIG. 7 engages with a gear box.

In a second embodiment of the nailer device according to the present invention, the sliding connection structure between the striking rod and the gear box along the longitudinal axis of the striking rod is different to that in the first embodiment. In the second embodiment, the striking rod 41 also comprises a flat surface 414 which joins the end face 416 of the second end 412 and is parallel with a surface 141 of the projection 14 which contacts with the striking rod 41 when the impact wheel 10 is in the second axial position. However, no hole or groove structure for mounting the pin is arranged on the striking rod and the gear box. As shown in FIGS. 7-8, the striking rod 41 comprises a flat surface 51 on its peripheral outer surface, and the gear box 15 correspondingly comprises an inner surface 61 for mating with the flat surface 51 on the striking rod 41. When the striking rod 41 is inserted into the gear box 15, the flat surface 51 is engaged with the inner surface 61, which prevents the striking rod 41 from rotating around its longitudinal axis 411, without limiting the striking rod 41 to move along its longitudinal axis direction. As a result, the projection 14 contacts with the flat surface 414 all the way when the impact wheel 10 is in the second axial position.

Figure 9:
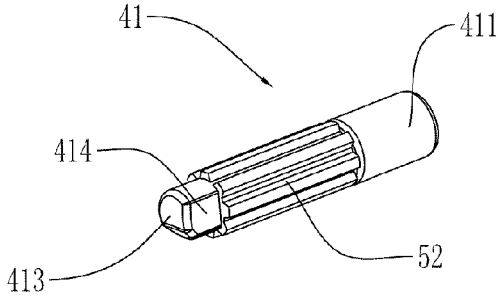
FIG. 9 is a perspective schematic view of a striking rod of a nailer device according to a third embodiment of the present invention.
Figure 10:
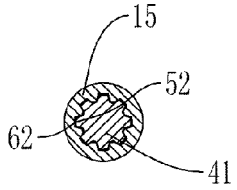
FIG. 10 is a cross sectional view of a portion where the striking rod in FIG. 9 engages with a gear box.

The surface where the striking rod 41 slidably engages with the gear box is not restricted as a flat surface. For example, the surface may be a curved surface or an irregular surface. A third embodiment of the nailer device according to the present invention is shown in FIGS. 9-10. A portion of the peripheral outer surface of the striking rod 41 is shaped with a toothed surface 52, and the inner surface where the gear box 15 mates with the toothed surface 52 is also a toothed surface 62 accordingly, so that the movement of the striking rod 41 along its longitudinal axis is allowable and the rotation of the striking rod 41 around the longitudinal axis is prevented.

In summary, it will be understood that the nailer device of the present invention is not restricted to the particular embodiments illustrated and disclosed hereinabove. Accordingly, any substitutes and modifications of the configuration and position of the members according to the spirit of the present invention will be regarded as falling within the range of the present invention.

Figure 11:
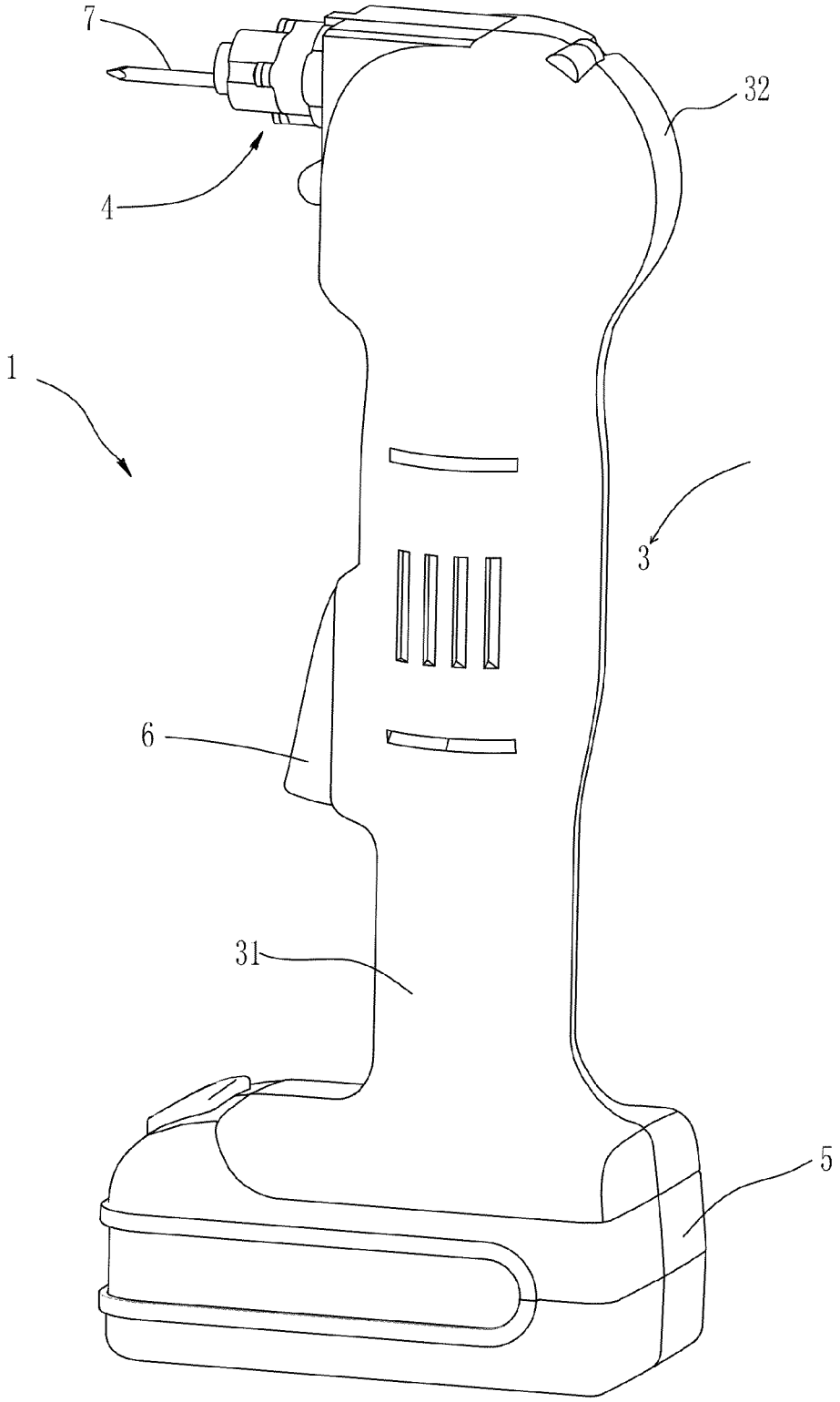
FIG. 11 is a schematic perspective view of a nailer device according to the present invention.
Figure 12:
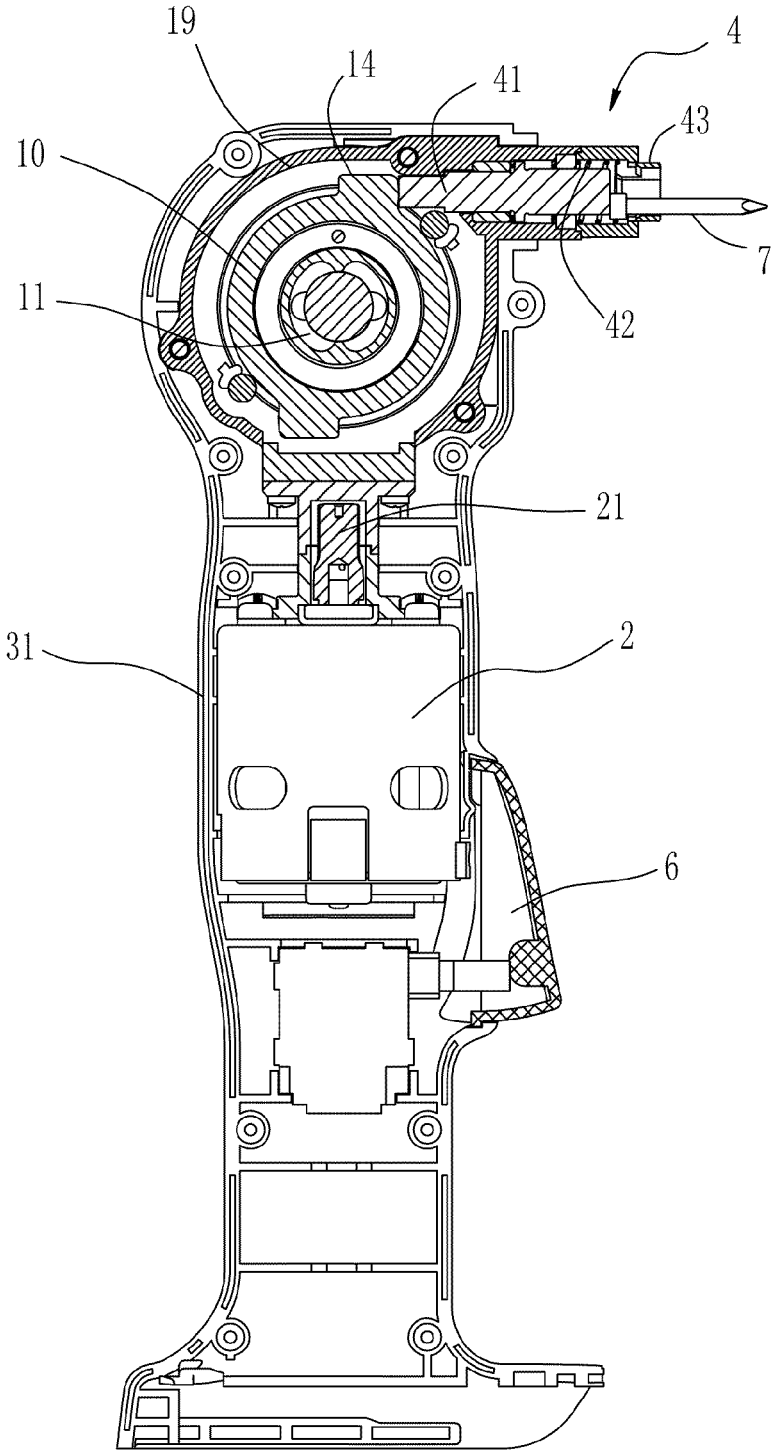
FIG. 12 is a cutaway view of the nailer device of FIG. 4 taken along a combination surface of the two half housings, wherein a battery pack of the nailer device is removed for clarity.
Figure 13:
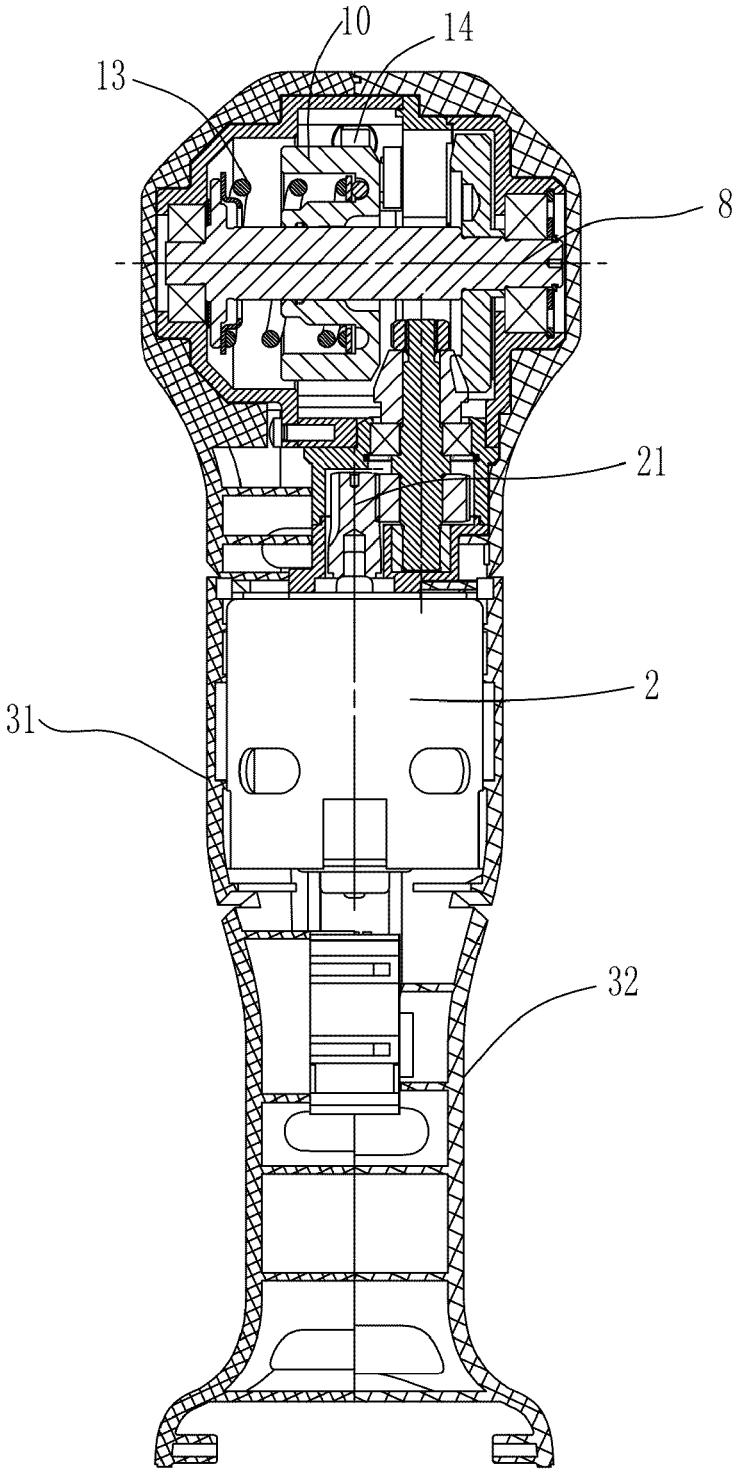
FIG. 13 is a cutaway view of the nailer device of FIG. 4 taken along the surface which is perpendicular to the combination surface of the two half housings, wherein the battery pack of the nailer device is removed for clarity.

With reference to FIGS. 11 and 12, a nailer device 1 of an exemplary embodiment comprises a housing 3 containing a motor 2 and having a nozzle portion 4. The housing 3 is composed with a first half housing 31 and a second half housing 32. A substantially vertical grip is formed on a main body of the housing 3. An upper portion of the housing 3 extends forward to form as a nozzle portion 4.

In this embodiment, the nailer device 1 comprises a battery pack 5 for powering the motor 2. The nozzle portion 4 includes a striking rod 41 mounted therein through a restoring spring 42 for striking a nail 7. The striking rod 41 is disposed substantially perpendicular to the main body of the housing 3 and is moved in a reciprocating manner within the nozzle portion 4. During operation, the end face of the striking rod 41 acts on a head of the nail 7. The nozzle portion 4 further includes a retractable nail containing sleeve 43. The inner diameter of the nail containing sleeve 43 is bigger than the nails commercially used, thus nails with different shapes and sizes can be placed therein.

With reference to FIGS. 13-19, a transmission mechanism is arranged in the housing 3 for converting rotating motions of the motor 2 into impact motions of the striking rod 41. The motor 2 is mounted vertically within the housing 3, having an upward motor shaft 21 connected with a multi-stage gear transmission mechanism including bevel gears. In this way, the rotation power of the motor 2 is transmitted to a rotating shaft 8 which is mounted in the upper portion of the housing 3 by two bearings. A pair of slots 9, only one of which is shown, is formed on the rotating shaft 8. The slot 9 comprises an actuator slot portion 91 and a cushion slot portion 92. The actuator slot portion 91 comprises a first direction along its length, and the cushion slot portion 92 comprises a second direction along its length. The actuator slot portion 91 and the cushion slot portion 92 are joined through smooth curves at the intersection of the two directions. Preferably, the length of the cushion slot portion 92 is shorter than that of the actuator slot portion 91. The length of the cushion slot portion 92 may also be designed equal to or longer than the length of the actuator slot portion 91. However, this would result in an increase of the length of the slot 9 in the outer cylindrical surface of the rotation shaft, which then requires an increase of the diameter of the rotating shaft to provide a larger area of the outer cylindrical surface for machining the slot 9. An impact wheel 10, which is substantially a hollow cylinder, is mounted on the rotating shaft 8. The impact wheel 10 comprises a pair of guiding slots 11 which are formed on its inner wall and opposite to the slots 9 respectively. The guiding slots 11 are corresponding to the slots 9. In this embodiment, the guiding slots 11 are elongated slot with a single inclination direction which is substantially the same direction as the length of the actuator slot portion 91. A pair of steel balls 12 is arranged movably in two chambers formed by the slots 9 and the guiding slots 11. When the slots 9 are moved relative to the guiding slots 11, the chambers formed thereby are moved with a result that the steel balls 12 can be moved along with the chambers. The impact wheel 10 can thus be driven to rotate through the steel balls 12 within the slots 9 when the rotating shaft 8 is rotated. An energy storing spring 13 is mounted between the impact wheel 10 and the rotating shaft 8 in manner so that an end of the energy storing spring 13 abuts to a shoulder 81 of the rotating shaft 8 and the other end of the energy storing spring 13 abuts to a side surface of the impact wheel 10. Under an axial biasing force of the energy storing spring 13 acting upon the shoulder 81 and the impact wheel 10, the steel balls 12 are located at the joints 93 of the actuator slot portions 91 and the cushion slot portions 92 of the slots 9 and the bottom ends 111 of the guiding slots 11 as shown in FIG. 19A, when the rotating shaft 8 and the impact wheel 10 are actionless or rotated. In this state, the impact wheel 10 is at a first axial position relative to the rotating shaft 8.

Figure 14:
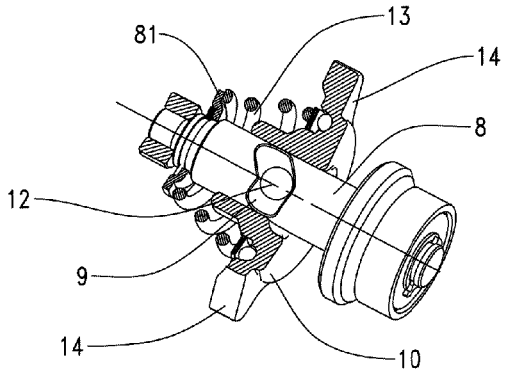
FIG. 14 is a perspective view of an impact mechanism of the nailer device of FIG. 4, wherein half of the spring and the impact wheel are cutaway.
Figure 15:
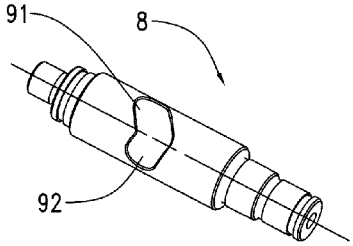
FIG. 15 is a perspective view of the rotating shaft of FIG. 14.
Figure 16:
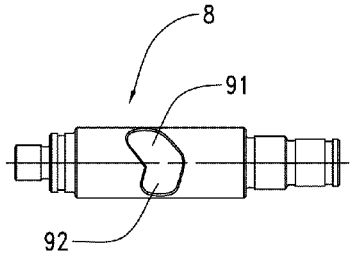
FIG. 16 is a front view of the rotating shaft of FIG. 14.
Figure 17:
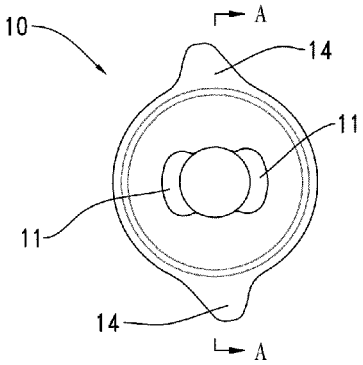
FIG. 17 is a front view of the impact wheel of FIG. 14.
Figure 18:
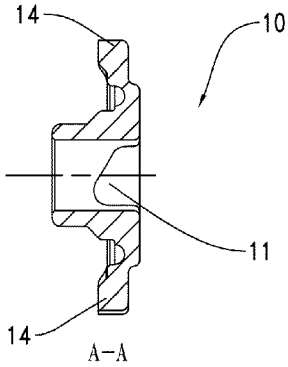
FIG. 18 is a cutaway view of the impact wheel of FIG. 17 taken along A-A direction.
Figure 19A:
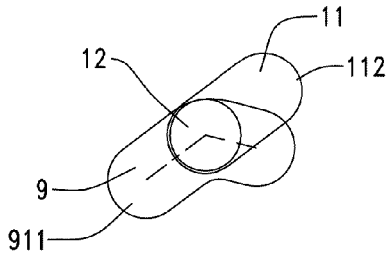
FIG. 19 A-D are schematic views showing the states of the movement of the steel ball, the guiding slot in the inner wall of the impact wheel and the slot of the rotating shaft in the embodiment of FIG. 14.
Figure 20A:
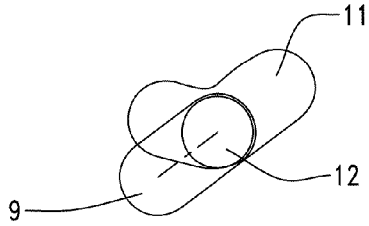
FIG. 20A-D are schematic views showing the states of the movement of the steel ball, the guiding slot in the inner wall of the impact wheel and the slot of the rotating shaft in another embodiment.
Figure 19B:
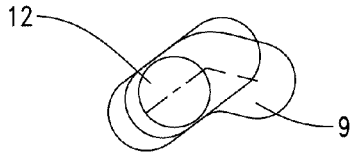
Figure 20B:
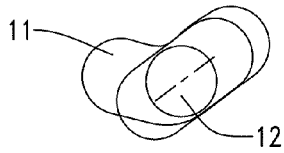
Figure 19C:
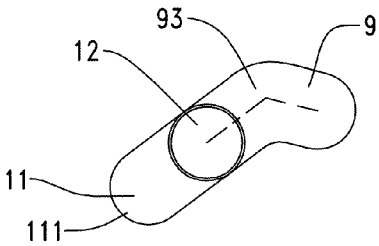
Figure 20C:
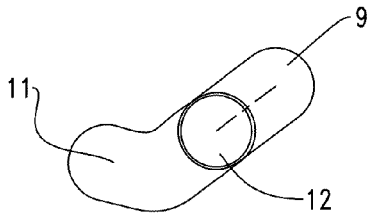
Figure 19D:
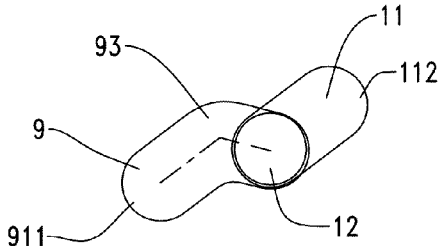
Figure 20D:
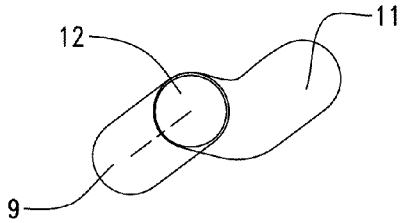
Figure 21A:
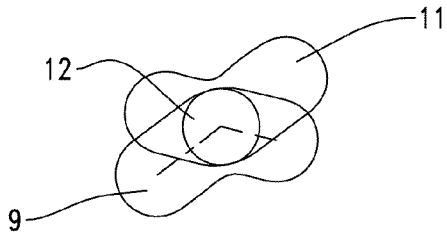
FIG. 21A-D are schematic views showing the states of the movement of the steel ball, the guiding slot in the inner wall of the impact wheel and the slot of the rotating shaft in still another embodiment.
Figure 21B:
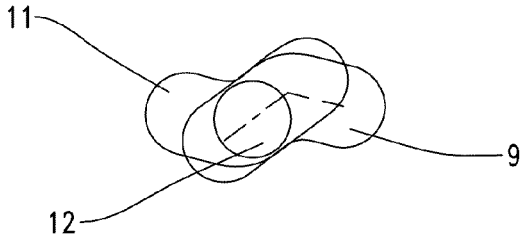
Figure 21C:
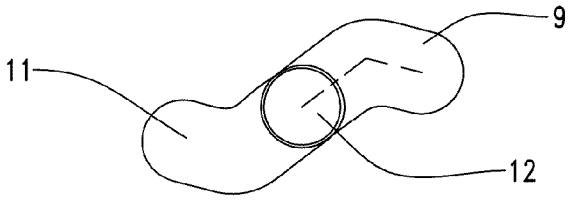
Figure 21D:
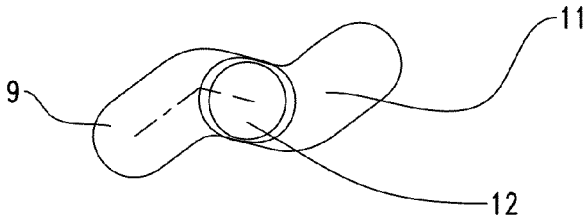

With reference to FIGS. 12 and 14, a pair of projections 14, which are extended along the diameter direction of the impact wheel 10, is provided on the periphery thereof. When the switch 6 is turned on, the motor 2 is powered to rotate to drive the rotating shaft 8 through the multi-stage gear transmission and the impact wheel 10 is rotated together with the rotating shaft 8 under the cooperation of the slots 9, the guiding slots 11, the steel balls 12, and the energy storing spring 13. So at the first axial position, the impact wheel 10 rotates in a circle under the function of the rotating shaft 8 and the steel balls 12. When the impact wheel 10 is rotated to a position where the projections 14 contact the striking rod 41, and the striking rod 41 encounters a larger resistance that is difficult to be overcome provisionally, the impact wheel 10 is provisionally stopped from rotating by the striking rod 41, while the locations of the guiding slot 11 of the impact wheel 10, the steel ball 12 and the slot 9 of the rotating shaft 8 are indicated with the solid lines in FIG. 19A. As the rotating shaft 8 is driven to continue rotating, each of the slots 9 is rotated from a location indicated in FIG. 19A to a middle location indicated in FIG. 19B so that each corresponding steel ball 12 is pressed to move downwards along with the actuator slot portion 91 of the slot 9. Accordingly, the impact wheel 10 is pushed to move from the first axial position to a second axial position and presses the energy storing spring 13 thereby. At the second axial position as shown in FIG. 19C, the steel ball 12 is moved to the bottom end 911 of the actuator slot portion 91 and the upper end 112 of the guiding slot 11. In this case, the energy storing spring 13 is pressed in maximum degree, the projection 14 of the impact wheel 10 departs from the striking rod 41, so that the rotating of the impact wheel 10 can not be stopped by the striking rod 41 any more, and the elastic potential energy of the energy storing spring 13 is released. Under a function of rebound force of the energy storing spring 13, the impact wheel 10 is pressed back to its first axial position quickly and is rotated at a higher speed. As a result, the striking rod 41 is impacted by the projections 14 of the impact wheel 10 to move at a high speed at the first axial position in a direction away from the projections 14 and the striking rod 41 strikes the head of the nail 7 quickly. In this way, a strike action is achieved. Meanwhile, the steel balls 12 are moved quickly, with the cooperation of the rotating shaft 8 and the impact wheel 10, from the bottom end 911 of the actuator slot portion 91 to the joint end 93 between the actuator slot portion 91 and the cushion slot portion 92. When arriving at the joint end 93, the steel ball 12 continues moving into the cushion slot portion 92, as shown in FIG. 19D.

When the strike action is finished, the striking rod 41 is returned back to its original position under the rebound force of the restoring spring 42. When the projections 14 are continuously driven to rotate to contact the striking rod 41, the impact wheel 10 is stopped rotating again to enter into succeeding cycles, which will be achieved in the same manner. While the striking rod 41 is moved to drive the nail 7, the restoring spring 42 is compressed.

It should be understood that, in this embodiment, the configuration of the slots 9 on the rotating shaft 8 can also be used for the guiding slots 11 on the impact wheel 10. That is to say, the guiding slots 11 on the impact wheel 10 can also be designed to have a cushion slot portion. Succession of movement states of the guiding slot 11 on the impact wheel 10 with a cushion slot portion, the slot 9 on the rotating shaft 8 without a cushion slot portion and the steel ball 12 are shown in FIGS.

20A-D. Succession of movement states of the guiding slot 11, the slot 9, both of which have a cushion slot portion, and the steel ball 12 are shown in FIGS. 21A-D. In the two cases, succession of the movement status of the guiding slot 11, the slot 9 and the steel ball 12 are substantially same as that in FIGS. 19A-D, so that the detailed description is omitted.

Figure 22:
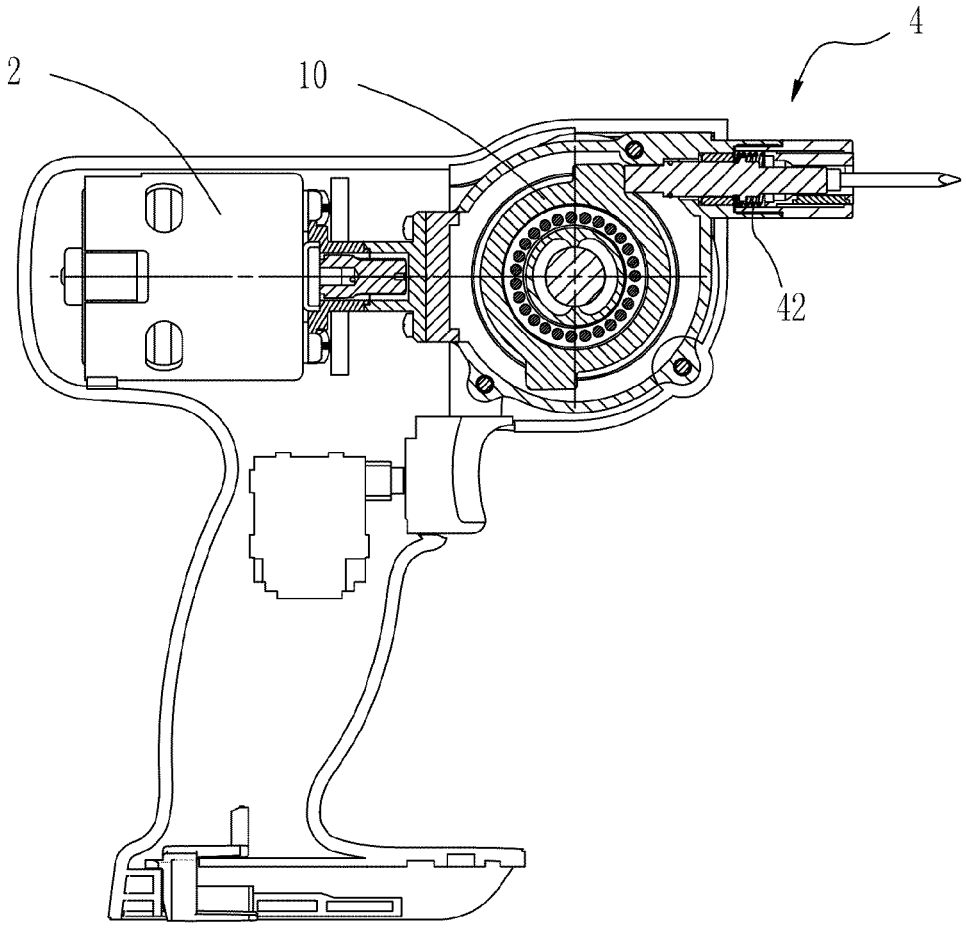
FIG. 22 is a cutaway view of another embodiment of the nailer device.

The nailer device of this embodiment can also be embodied with other shapes. With reference to FIG. 22, a second exemplary embodiment of a nailer device according to the present invention is shown. A housing 3 of the nailer device in the second embodiment is substantially T-shaped when the battery pack is removed, and a motor 2 is arranged horizontally in the housing 3 and behind a nozzle 4. However, a transmission mechanism and the principle utilized in the nailer device in the second exemplary embodiment are similar to those in the first embodiment and, as such, need not be described in detail herein.

Additionally, the springs 13, 42 in the above embodiments may be substituted with other biasing members or other means for producing attraction force or exclusion force, for example, magnetic members.

The impact wheel 10 in the above embodiments may also be substituted with a piston, a centrifugal member, or a spring to impact the striking rod.

Figure 23:
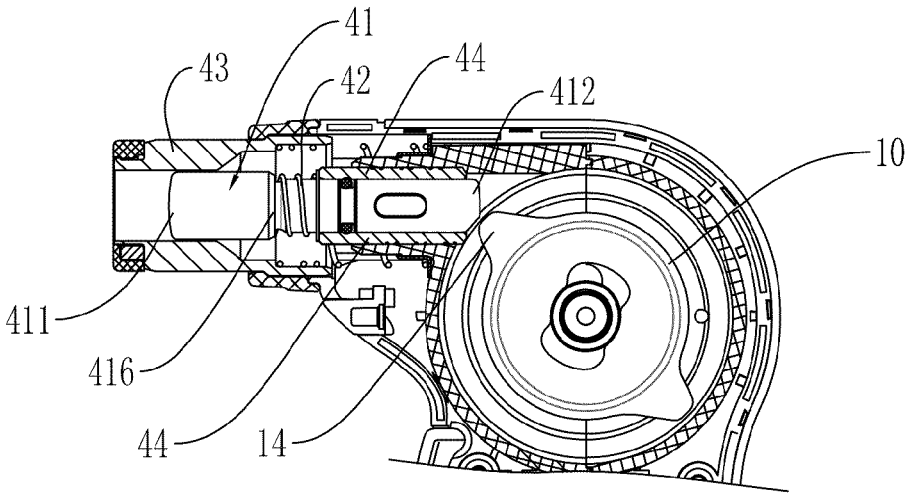
FIG. 23 is a sectional view of a nozzle portion of the nailer device of FIG. 1, wherein the striking rod is in an initial position.
Figure 24:
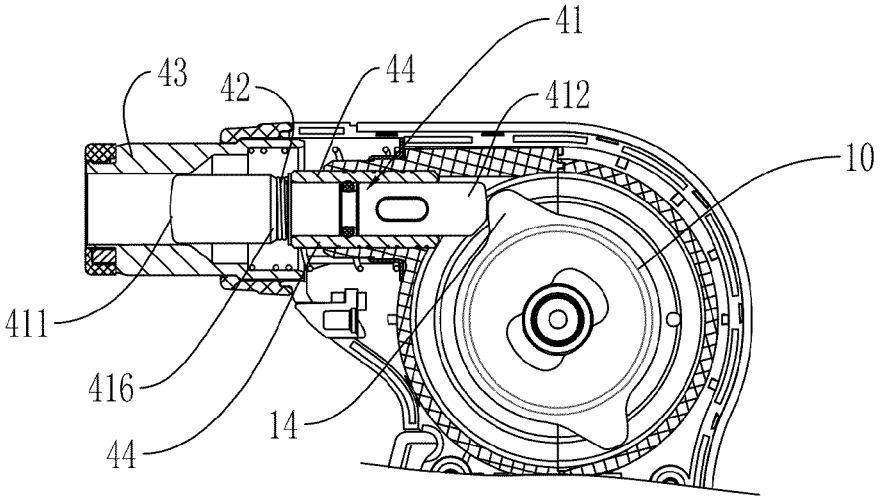
FIG. 24 is a sectional view of the nozzle portion of the nailer device of FIG. 1, wherein the striking rod is in a stricken position.
Figure 25:
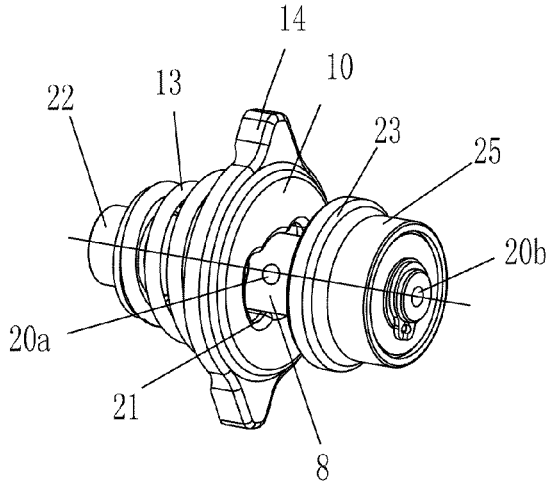
FIG. 25 is a perspective view illustrating a transmission mechanism of the nailer device of FIG. 11.
Figure 26:
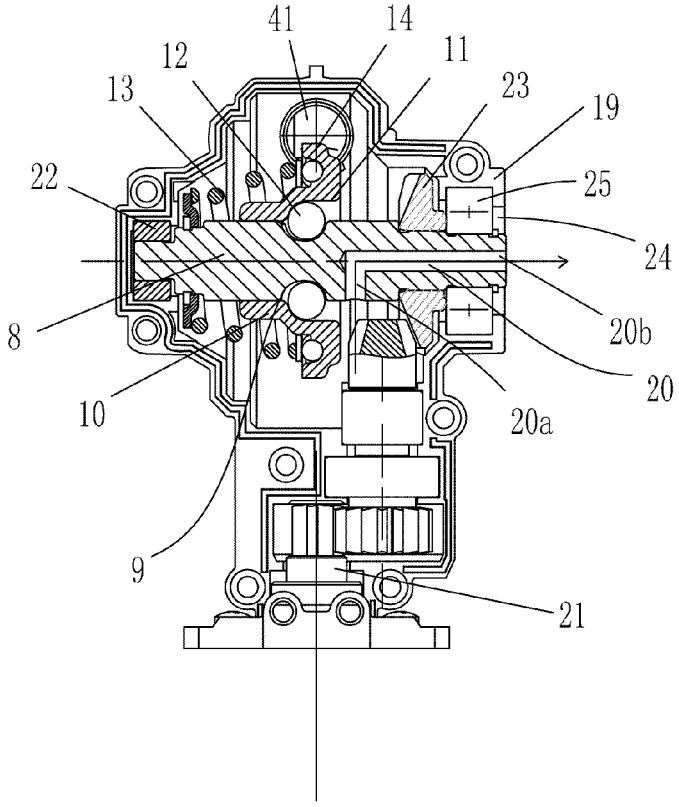
FIG. 26 is a detailed sectional view illustrating a gear housing of the nailer device of FIG. 12.

With reference to FIGS. 23 and 24, a shaft sleeve portion 44, which is integrated with the gear housing, is disposed in the nozzle portion 4 of the nailer device, and the striking rod 41 is inserted in the shaft sleeve portion 44. A restoring spring 42 is mounted on the striking rod 41 in such a manner that one end of the spring 42 abuts to the shoulder 416 of the striking rod 41 and the other end thereof abuts to the end surface of the shaft sleeve portion 44. The restoring spring 42 exerts a spring force toward the outside of the housing on the striking rod 41, along the longitudinal direction of the striking rod 41. When no external force is acted on the striking rod 41, the striking rod 41 is located at an initial position due to the spring force of the spring 42 where the striking rod 41 does not contact with the projections 14 of the impact wheel 10, as shown in FIG. 23. In this case, the spring 42 exhibits a first elastic state that the stricken end 412 of the striking rod 41 is positioned beyond the motion track along the circumference of the projections 14. When an external force is applied to the striking rod 41, i.e. the nail is needed to be nailed into a solid object, the striking rod 41 receives a larger resistance which overcomes the spring force of the spring 42 and urge the striking rod 41 to move to approach the impact wheel 10. Upon the striking rod 41 moves to the position shown in FIG. 24, the spring 42 exhibits a second elastic state that the striking rod 41 is located on a stricken position where the striking rod 41 may contact with the projections 14 of the impact wheel, and the stricken end 412 of the striking rod 41 is arranged in the motion track along the circumference of the projections 14. As a result, the projection 14 may contact with the stricken end 412 of the striking rod 41 at one position in this motion track.

The restoring spring 42 as mentioned above may be formed as a compression spring or coil spring. However, those skilled in the art may easily understand that the spring 42 may be substituted with other elastic members or biasing members for producing attraction force or exclusion force such as, for example, magnetic members.

As shown in FIG. 4, an energy storing spring 13 is mounted between the impact wheel 10 and the rotating shaft 8 so that one end of the energy storing spring 13 abuts to a shoulder 81 of the rotating shaft 8 and the other end thereof abuts to the impact wheel 10. The axial force of this energy storing spring 13 may be used to make the impact wheel 10 to locate at a first axial position relative to the rotating shaft 8. At this first axial position, the impact wheel 10 rotates circumferentially under the action of the rotating shaft 8 and the steel balls 12. If the striking rod 41 is now located at the stricken position shown in FIG. 24, the striking rod 41 stops the rotation of the impact wheel 10 temporarily because it encounters a larger resistance which cannot be overcome temporarily when the impact wheel 10 rotates to a position where the projections 14 may contact with the striking rod 41. As a result, the impact wheel 10 is pushed to gradually press the energy storing spring 13 and thereby moves from the first axial position to a second axial position. At this second axial position, the projections 14 of the impact wheel 10 depart from the striking rod 41. At this moment, the energy storing spring 13 releases the elastic potential energy thereof. Under the function of the rebound force of the energy storing spring 13, the impact wheel 10 is axially back to its first axial position, and a high speed rotation which exceeds the rotating shaft in speed will be produced with the cooperation of the inclined slots 9, the guiding slots 11 and the steel balls 12. As a result, the stricken end 412 of the striking rod 41 is impacted by the projections 14 of the impact wheel 10 to strike the nail 7 at high efficiency, and thus a strike action is achieved. After the first strike action is completed, the striking rod 41 is returned back to its initial position as shown in FIG. 23 under the rebound force of the restoring spring 42. When the impact wheel 10 is stopped rotating again by the striking rod 41, it enters into a second impact cycle, and the succeeding impact cycles will be achieved in the same manner.

With reference to FIGS. 12-25, 26, a motor shaft 21 is connected with the input end of the transmission mechanism, and the power output end of the transmission mechanism is mated with the striking rod 41. The rotation power of the motor 2 is transmitted to a main shaft 8 by a multi-stage gear transmission mechanism. The main shaft 8 is perpendicular to the motor shaft 21 and provided with two pairs of inclined slots 9. An impact member 10, which is a generally hollow cylinder, is mounted on the main shaft 8. The impact member 10 comprises a pair of guiding slots 11 which are formed on its inner cylinder surface and opposite to the inclined slots 9 respectively. A pair of steel balls 12 is arranged between the inclined slots 9 and the guiding slots 11. The impact member 10 can thus be driven to rotate via the steel balls 12 arranged in the inclined slots 9 when the main shaft 8 is rotated. A spring 13 is mounted between the impact member 10 and the main shaft 8 so that one end of the spring abuts to a shoulder 22 of the main shaft 8 and the other end thereof abuts to the impact member 10. A projection 14 on the impact member 10 impacts the end surface of the striking rod 41 when the main shaft 8 rotating, and then the striking rod 41 presses the spring 42 and strikes the nail under the function of the impact force, so that an impact action is achieved.

The main shaft 8 is driven by a gear 23 which is driven indirectly by the motor shaft 21. A bearing 25 is arranged on an end of the main shaft 8. An opening 24 is formed on the gear housing 19, through which the end of the main shaft 8 is exposed. A through-hole 20, which illustrated in this embodiment as the form of L-shaped in section, is provided in the main shaft 8. The through-hole 20 includes a first opening 20*a* and a second opening 20*b*. The first opening 20*a* is disposed on the surface of the main shaft 8 and is communicated with the interior of the gear housing 19, while the second opening 20*b* is disposed on the end of the main shaft 8 and is communicated with the outside of the gear housing 19.

During the operation of the nailer device, the transmission mechanism is driven by the motor 2 to operate at high speed and bring the impact member 10 to create the impact action.

As a result, high temperature is formed upon impacting and makes the inner grease boiled away partially. Meanwhile, with the temperature increasing, the pressure of the interior of the gear housing 19 is increased. The high-pressure air in the gear housing 19 is then discharged from the through-hole 20 in the direction shown by the arrow in FIG. 26, the inner pressure is thereby decreased effectively and the possibility of grease leakage is reduced.

In the case that the grease boiled at the high temperature enters into the first opening 20*a* of the through-hole 20, the grease may be attached onto the wall of the first opening 20*a* when it encounters the cooling air and is thereby condensed. However, the grease attached thereon can be thrown off from the first opening 20*a* by means of the centrifugal force generated by the main shaft 8 rotating at high speed, so that the through-hole 20 is be prevented from blocking and the function of releasing pressure is thereby be maintained.

It should be understood to those skilled in the art that the through-hole 20 may also be in the form of arcuate in section, or any other shapes which may communicate the interior and the outside of the gear housing 19. It is also preferable to arrange a plurality of the openings on the surface of the main shaft 8 for better decreasing the air pressure. The electrical device described in this invention is not limited to the embodiments described above and the configurations shown in the drawings. There are many variations, substitutes and modifications in the shapes and locations of the components based on the present invention, and such variations, substitutes and modifications will all fall in the scope sought for protection in the present invention.

Figure 27:
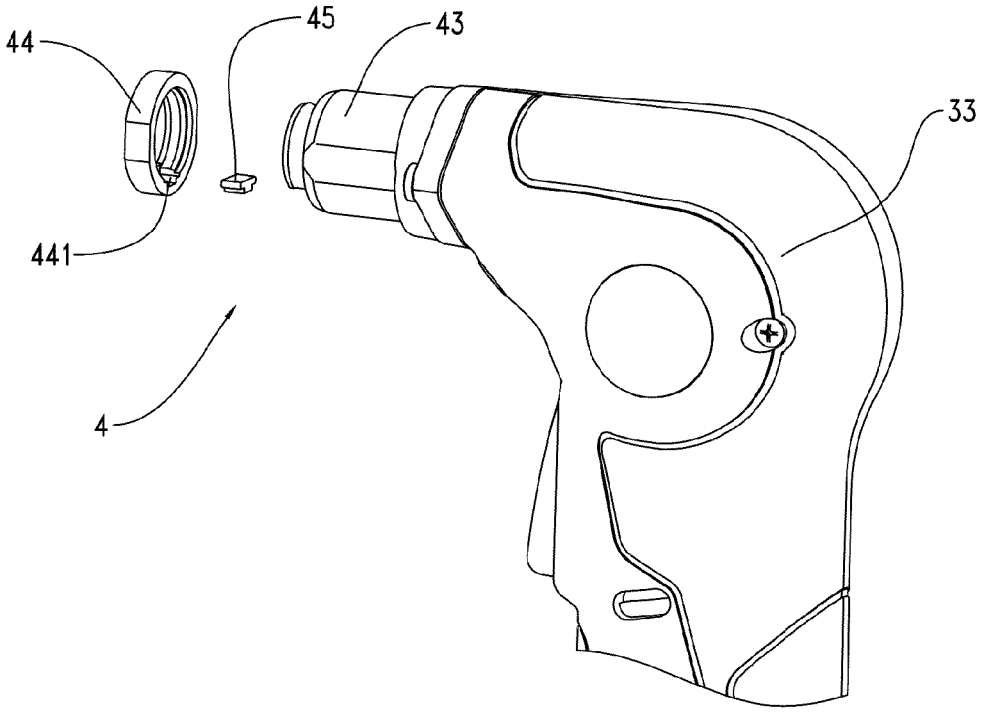
FIG. 27 is a partial perspective view of the nailer device of FIG. 1, wherein the nozzle portion is exploded.
Figure 28:
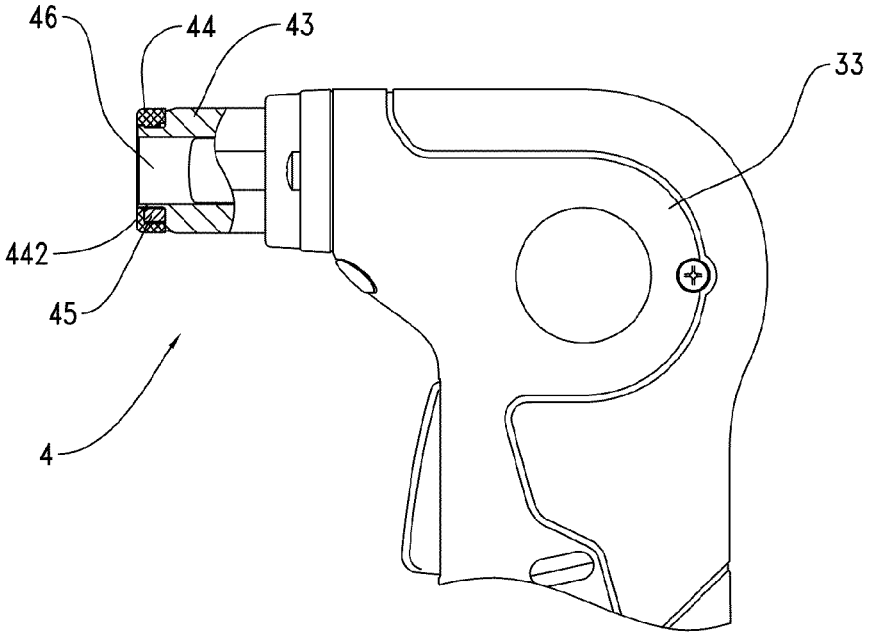
FIG. 28 is a partial front elevation view of the nailer device of FIG. 1, wherein the nozzle portion is shown as a sectional view.
Figure 29:
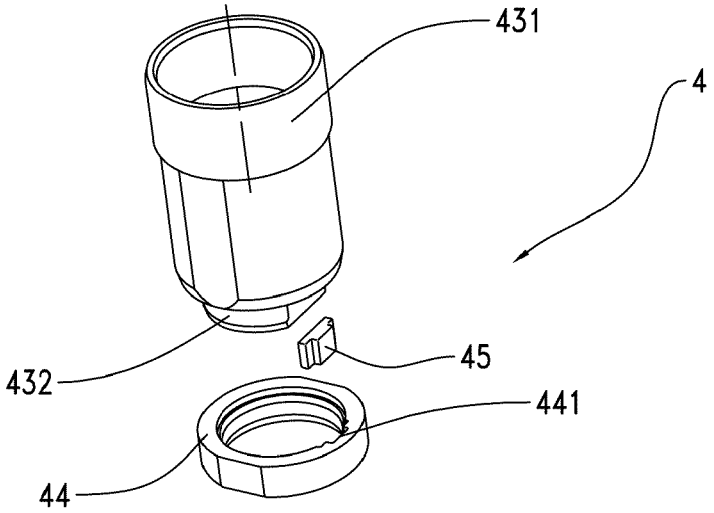
FIG. 29 is an exploded view of the nozzle portion of the nailer device of FIG. 1.

With reference to FIGS. 27-29, the nozzle portion 4 comprises a sleeve 43, a magnet 45 for attracting a nail, and a fixing member 44 which can fix and locate the magnet 45 on the nozzle portion 4. The sleeve 43 comprises a first end 431 that is connected to the head portion 2 and a second end 432 that is connected with the fixing member 44. The inner surface of the fixing member 44 is provided with a groove 441 within which the magnet 45 is arranged. Preferably, the groove 441 may be shaped to be mated with the magnet 45 so that the groove 441 can be engaged with the magnet 45 arranged therein more closely. The fixing member 44 is mounted around the outer surface of the second end 432 of the sleeve 43, so that the magnet 45 is fixed within the nozzle portion 4 of the nailer device between the sleeve 43 and the fixing member 44.

A nail containing opening 46 is formed by the inner hole of the sleeve 43. The nail can be attracted in the nail containing opening 46 by the magnet 45. The nail containing opening 46 has an inner diameter that is greater than that of the nails generally used, such that the nails with varied shapes and sizes can be placed therein.

In the present invention, the fixing member 44 is made of flexible material so that the surface onto which the nail is nailed will be effectively prevented from damaging. It is also feasible that only an end surface 442 of the fixing member 44 for contacting with the surface of the object is made of flexible material, or that a protection piece made of flexible material is attached onto the end surface 442. Such flexible material comprises plastic, rubber and the like.

Figure 30:
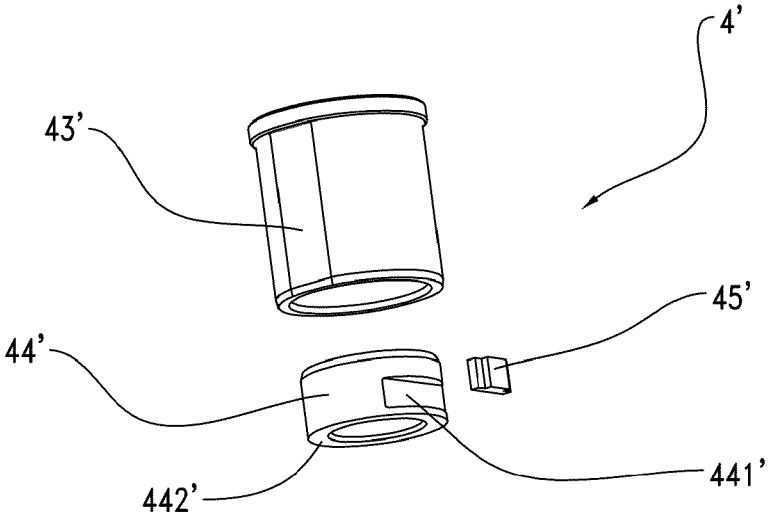
FIG. 30 is an exploded view of the nozzle portion according to another embodiment.

FIG. 30 showing a nozzle portion 4' of the nailer device according to another embodiment of the present invention. In this embodiment, the outside surface of the fixing member 44' is provided with a groove 441' in which the magnet 45' can be accommodated. During assembly, the magnet 45' is placed into the groove 441', and then the fixing member 44' is mounted in the inner hole of the sleeve 43'. Similarly, the end surface 442' of the fixing member 44', which contacts with the surface of the object into which the nail is nailed, is also made of the flexible material, so as to protect the surface of the object.

In conclusion, the nailer device is not limited to the embodiments described above and the configurations shown in the drawings. Rather, from the description herein, those of skilled in the art will recognize that there are many variations, substitutes and modifications in the shapes and locations of the components that may be made, and such variations, substitutes and modifications all fall in the scope sought for protection in the present invention.

What is claimed is:

1. An electrical device comprising:

a motor;

a switch operable to control the motor;

an impact member; and a transmission mechanism disposed in a gear housing coupled to the motor for driving the impact member, the transmission mechanism comprising a shaft having a through-hole wherein a first opening of the through-hole is communicated with the interior of the gear housing and a second opening of the through-hole is communicated with an exterior of the gear housing.

2. The electrical device as recited in claim 1, wherein first opening is arranged on a surface of the shaft and the second opening is arranged on an end of the shaft.

3. The electrical device as recited in claim 2, wherein the through-hole is generally L-shaped.

* * * * *